(12) United States Patent
Biermann

(10) Patent No.: US 8,603,224 B2
(45) Date of Patent: *Dec. 10, 2013

(54) METHOD FOR THE REMOVAL OF MERCURY FROM A STREAM OF FLUE GAS OBTAINED FROM THE COMBUSTION OF COAL AND SORBENT-MIXTURE

(75) Inventor: Joseph J. P. Biermann, Apeldoorn (NL)

(73) Assignee: Voith Patent GmbH, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,257

(22) Filed: Apr. 27, 2012

(65) Prior Publication Data

US 2012/0266752 A1  Oct. 25, 2012

Related U.S. Application Data

(63) Continuation of application No. PCT/NL2010/050717, filed on Oct. 27, 2010.

(30) Foreign Application Priority Data

Oct. 27, 2009  (NL) ..................................... 2003717

(51) Int. Cl.
*B01D 53/02*  (2006.01)

(52) U.S. Cl.
USPC ............... 95/134; 95/107; 110/203; 110/345; 423/210

(58) Field of Classification Search
USPC .............. 95/107, 134; 110/203, 345; 423/210
See application file for complete search history.

(56) References Cited

U.S. PATENT DOCUMENTS

| | | |
|---|---|---|
| 2004/0205995 A1 | 10/2004 | Zucchelli et al. |
| 2006/0210463 A1 | 9/2006 | Comrie |
| 2007/0184394 A1 | 8/2007 | Comrie |

FOREIGN PATENT DOCUMENTS

| | | |
|---|---|---|
| JP | 2008-39341 A | 2/2008 |
| WO | 96/06057 A1 | 2/1996 |
| WO | 02/058823 A1 | 8/2002 |

OTHER PUBLICATIONS

International Search Report dated Jan. 28, 2011 for International Application No. PCT/NL2010/050717 (3 pages).
Notification of Transmittal of the International Search Report and the Written Opinion of the International Searching Authority, or the Declaration dated Feb. 7, 2011 for International Application No. PCT/NL2010/050717 (12 pages).
Joel J P Biermann and Jost O L Wendt: "Mercury Capture and Fixation in Coal Fired Power Plants Using MinPlus Sorbent", AIR QUALITY VI, Sep. 24-27, 2007; Marriott Crystal Gateway, Arlington, VA (Conference Proceedings), Sep. 24, 2007 (15 pages).
X-ray diffraction studies of the transformation of kaolinite int metakaolin: I. variability of interlayer spacings. Mitra, G.B. and Bhattacherjee, S. vol. 54, Sep.-Oct. 1969, The American mineralogist, pp. 1409-1418 (10 pages).
Smith, J.D. and Fahrenholtz, W.G. Ceramic and Glass materials: Structure, properties and processing. (ed.] J.F. Shackelford and R.H. Doremus. s.l. : Springer Science and Business media, 2008. p. 102. vol. Chapter 6: refractory oxides. ISBN 978-0-387-73361-6 (24 pages).
Computer Controlled Scanning Electron Microscopy measurement (CCSEM; Chen. Y., 2004 Fuel Process. Technol. pp. 743-761. vol. 85 (19 pages).
International Search Report dated Jan. 28, 2011 for International Application No. PCT/NL2010/050718 (4 pages).

*Primary Examiner* — Christopher P Jones
(74) *Attorney, Agent, or Firm* — Taylor IP, P.C.

(57) ABSTRACT

A method for the removal of mercury from a stream of flue gas obtained from the combustion of at least one coal includes the steps of introducing a kaolin- or metakaolin-containing sorbent into the stream of flue gas for removing mercury from the stream of flue gas and contacting the mercury with the kaolin or metakaolin-containing sorbent in the presence of active free silica. Further to the introduction of the kaolin- or metakaolin-containing sorbent into the stream of flue gas, a source of active free silica is introduced so as to increase the active free silica content of the flue gas resulting from the combustion by the introduction of additional free silica. The flue gas has a temperature of at least approximately 900° C., for example >1000° C. at the point where the kaolin or metakaolin-containing sorbent is introduced.

14 Claims, 5 Drawing Sheets

METHOD FOR THE REMOVAL OF MERCURY FROM A STREAM OF FLUE GAS OBTAINED FROM THE COMBUSTION OF COAL AND SORBENT-MIXTURE

CROSS REFERENCE TO RELATED APPLICATIONS

This is a continuation of PCT application No. PCT/NL2010/050717, entitled "A METHOD FOR THE REMOVAL OF MERCURY FROM A STREAM OF FLUE GAS OBTAINED FROM THE COMBUSTION OF COAL AND A SORBENT-MIXTURE", filed Oct. 27, 2010, which is incorporated herein by reference.

BACKGROUND OF THE INVENTION

1. Field of the Invention

The present invention relates to a method for the removal of mercury from a stream of flue gas obtained from the combustion of at least one coal. The method includes the step of introducing a kaolin- or metakaolin-containing sorbent into the stream of flue gas for removing mercury from the stream of flue gas and contacting the mercury with the kaolin or metakaolin-containing sorbent in the presence of active free silica.

2. Description of the Related Art

Such a method is known from W002/058823 which teaches that mercury can be removed from a gas stream using a metakaolin-comprising sorbent.

It has been found that at some facilities where coal is combusted to generate electricity, the amount of mercury captured using a metakaolin-comprising sorbent is unexpectedly low, requiring larger amounts of sorbent. This use of more sorbent increases the cost of removal of mercury, and not just because of the cost of the sorbent. The cost is also increased because spent sorbent has to be removed from the flue gas, e.g. using an electrostatic filter or a bag filter, and if more spent sorbent is to be removed from the stream of flue gas, both the financial outlay for filters and the cost of operating them is increased. In addition or alternatively, the mercury can be removed from the flue gas at relatively lower temperatures, i.e. after it has cooled down more. This also increases the cost of a facility and the operation thereof, because in this low-temperature case carbon-containing sorbents have to be used. These carbon-containing sorbents generally reduce the sale-potential of the fly-ash and spent sorbent mixture collected from the filters. Moreover, these carbon-containing sorbents are more difficult to handle and may cause fires in downstream equipment.

What is needed in the art is an improved method for the removal of mercury from a stream of flue gas obtained from the combustion of coal.

SUMMARY OF THE INVENTION

The present invention provides a method for removing mercury from a stream of flue gas obtained from the combustion of at least one coal, the method including the introduction of the kaolin- or metakaolin-containing sorbent into the stream of flue gas. Further a source of active free silica is introduced so as to increase the active free silica content of the flue gas resulting from the combustion of the at least one coal, wherein the flue gas has a temperature of at least approximately 900° C., for example >1000° C. at the point where the kaolin or metakaolin-containing sorbent is introduced.

Metakaolin is a dehydrated form of kaolin. If heated, kaolin will release water and is converted to metakaolin. In the present application, the term "free silica" means silica in the chemical form of $SiO_2$ or available as such, such as in (quartz) glass. The free silica as understood herein must be active. The adjective "active" is a functional limitation of free silica, because the silica has to be available, as will be discussed later. The Example section hereinafter shows how to determine the amount of active free silica.

The active free silica may be introduced as such, or may have been formed in the flue gas (or further upstream) from a source from which active free silica results (such a source is designated a source of active free silica). That is, the silica may be present and subsequently liberated as active free silica (e.g. by the combustion of silica-containing bituminous coal high in silica content) or chemically formed from a starting compound. The expression "introduction into the stream of flue gas" means downstream of the fireball where most of the oxidation takes place.

According to one aspect of the present invention the amount of active free silica in the flue gas is made larger than the total amount of active free silica derived from i) the at least one coal, and ii) the kaolin or metakaolin-containing sorbent.

The removal of mercury from a stream of flue gas may, for example, occur following the combustion of at least one coal type having an ASTM D388 coal rank of >3. It has been found that the efficiency with which mercury is removed from the flue gas may depend on the rank of the coal. A reduced efficiency has been found to occur in coal types having, an ASTM D388 coal rank of >3, sometimes referred to as sub-bituminous coals. Examples of such coal types are PRB and lignite. According to the present invention, the presence of active free silica enhances the removal of mercury from flue gas obtained by combustion of a coal of the specified coal rank by the kaolin metakaolin-containing sorbent, even at elevated temperatures (such as 900° C. or, surprisingly as we shall see later, higher).

US2007/184394 in the name of Comrie discloses the use of a sorbent including calcium and/or silica for the removal of mercury from a flue gas. The source of the flue gas may be coal combustion. The result is a cementitious ash product, which can be used to at least partially replace Portland cement. As an example of a source of calcium, paper de-inking sludge ash is mentioned. This ash is not disclosed as a metakaolin-containing material, which it would only be if prepared under quite specific conditions. For removal of mercury, relatively low temperatures are recommended (see paragraphs [0033, 0076]). To help removal of mercury at high temperatures, the addition of a halogen, such as CaBr, is proposed (see paragraph [00831]). This measure was already known. For further information that shows that the present invention involves an inventive step over US2007/184394, reference is made to the Example section in the present application. From that section, it will be clear that not any of $SiO_2$, CaO, $CaCO_3$ nor mixtures thereof result in appreciable removal of mercury at high temperatures.

According to a first embodiment of the present invention, the kaolin or metakaolin-containing sorbent is introduced by dispersing it into the stream of flue gas. This allows for a proper mixing and hence improved removal of mercury.

According to another embodiment of a present invention, a sorbent-mixture is introduced into the stream of flue gas, the sorbent-mixture including the kaolin or metakaolin-containing sorbent mixed with a source of active free silica. This allows for a proper distribution of sorbent and silica in the flue gas and hence improved removal of mercury.

For optimum removal of mercury, the weight percentage of active free silica relative to the weight of kaolin or metakaolin is between approximately 10 to 80%, for example between 20 to 60%, or between 30 to 50%, the weight of any kaolin being expressed as the weight of metakaolin.

Amounts of silica are expressed as amounts of active free silica as can be determined using the method described in example section IV. $SiO_2$ capable of expressing activating behavior in this method is considered active free $SiO_2$.

The present invention allows removal of mercury at elevated temperatures, at which temperatures mercury is present as elemental mercury (unionized). Hence, the flue gas has a temperature of at least approximately 500° C., for example >900° C., or >1000° C. at the point where the kaolin or metakaolin-containing sorbent is introduced.

This is in particular surprising, because metakaolin is converted at a temperature of >900° C. to a material ineffective at removing mercury, as can be seen in example section III. It is highly surprising that active free silica apparently is capable of reducing this problem, as active free silica by itself does not result in removal of mercury (see example section III, FIG. 5).

According to another embodiment of the present invention, the kaolin or metakaolin-containing sorbent is introduced into a boiler upstream of a heat exchanger for cooling the flue gas. This requires much fewer ports for dispersing the sorbent throughout the flue gas. In other words, a plant doesn't require a lot of costly modification to make it suitable for effective removal of mercury with rank ≥3 coal.

According to one embodiment of the present invention, the active free silica is derived from bituminous coal. Bituminous coal generally contains relatively more silica than coal of a higher coal rank. Release upon combustion of this silica as active free silica will contribute to or achieve the desired effect. If bituminous coal is used as a source of active free silica then at least approximately 60% of the $CO_2$ in the flue gas is derived from the at least one coal rank of >3.

Instead of having to haul bituminous coal itself over long distances, it will generally be more cost-effective to use active free silica-containing fly-ash obtained from the combustion of bituminous coal as the source of active free silica. Fly-ash from bituminous coal (with a rank <3) has been found to be a source of active free silica that is generated and/or liberated by the combustion of the bituminous coal.

In a further aspect of the present invention, the method provides for the removal of mercury from a stream of flue gas obtained from the combustion of a mixture of sub-bituminous coal and bituminous coal, wherein a (meta-) kaolin containing sorbent is introduced into the stream of flue gas for removal of mercury from the stream.

According to one embodiment of the present invention, the kaolin or metakaolin-containing sorbent is a sorbent obtained by thermal conversion of a paper-residue. Examples of paper-residue are paper-deinking sludge and waste paper.

According to a further embodiment, the kaolin or metakaolin-containing sorbent is a sorbent obtained by thermal conversion of kaolin-containing paper-residue to a material of pozzolanic properties, wherein the kaolin-containing paper residue is thermally treated in a fluidized bed installation having a freeboard in the presence of oxygen-containing gas, wherein the fluidized bed is operated at a temperature between approximately 720 and 850° C. and the temperature of the freeboard is approximately 850° C. or lower, and that the fluidized bed is provided with a device for promoting heat transfer.

This material prepared in accordance with WO9606057 has been found to be quite susceptible to activation by active free silica.

The present invention also relates to a sorbent-mixture including i) kaolin or metakaolin-containing sorbent obtained from the thermal conversion of a paper-residue; mixed with ii) a source of active free silica, wherein the weight percentage of active free silica relative to the weight of kaolin or metakaolin is between approximately 10 to 80%, for example between 20 to 60%, or between 30 to 50%, the weight of any kaolin being expressed as the weight of metakaolin. This sorbent-mixture is very convenient for use in the method according to the present invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
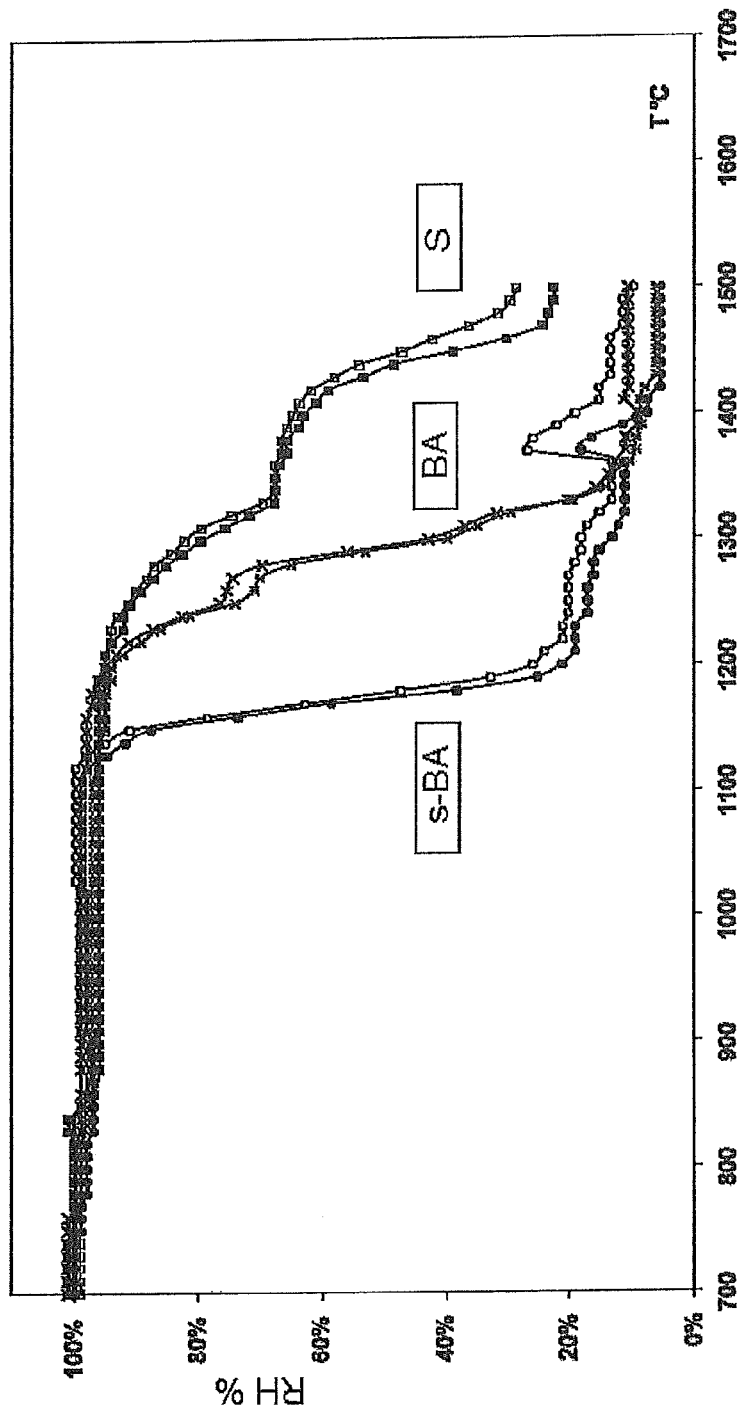
FIG. 1 shows the thermal behaviour of fly-ashes and metakaolin-containing sorbent.

The present invention provides a method for the removal of mercury from a stream of flue gas obtained from the combustion of at least one coal.

(I) Method for Determination of the Kaolin and Metakaolin Content

Reference 1 below describes a method for the determination of kaolin and metakaolin using differential thermal analysis (DTA). This method measures energy production and consumption of a sample as a function of increasing temperature. An endothermic peak at approximately 500° C. signifies the conversion of kaolin into metakaolin. An exothermic peak at approximately 1000° C. signifies the conversion of metakaolin into minerals like mullite, as described in Reference 2.

When calcium compounds are present, the DTA method described above is hindered by the decomposition of calcium carbonate which also occurs at approximately the same temperature at which kaolin is converted into metakaolin. DTA measurement in a carbon dioxide atmosphere solves this problem as it shifts the calcium carbonate peak to a higher temperature by suppressing the $CaCO_3=CaO+CO_2$ equilibrium. Another solution to the overlying peaks of kaolin and calcium carbonate is to measure the amount of water dissociated due to the conversion of kaolin into metakaolin. Yet another solution is to determine the amount of calcium carbonate using standard measurement methods (elemental analysis, and $CO_2$ evolution upon acid treatment), and then to subtract the associated calcium carbonate peak from the DTA spectrum.

Furthermore, when calcium compounds are present, the shape of the DTA metakaolin peak changes form due to the formation of calcium-aluminosilicate minerals. Consequently, this peak is widened.

Step-by-step, the method for determination of the kaolin and metakaolin content in a sorbent sample is:

1) Measure the concentrations of calcium, silicon, and aluminium in the sorbent sample using standard elemental analysis. Concentrations must be expressed on a weight basis (grams of compound per gram of sorbent sample).

2) Measure the concentration of carbonate in the sorbent sample, e.g. use of acid treatment and measurement of the amount of $CO_2$ evolved. The concentration must be expressed on a weight basis. Multiply the obtained concentration by 100/44 (molecular weight of $CaCO_3$/molecular weight of $CO_2$) to obtain the concentration of calcium carbonate in the sorbent sample.

3) Perform DTA measurements in a nitrogen atmosphere for each of the pure compounds of kaolin, metakaolin, and calcium carbonate. DeteLLline the location of the peaks identifying these compounds. The peaks of kaolin conversion into metakaolin and of calcium carbonate decomposition into calcium oxide will occur in overlapping temperature windows. Deconvolution of these Peaks will be explained in step 9.

4) Prepare a mixture of pure metakaolin ($Al_2O_3 \cdot 2\ SiO_2$), and pure calcium oxide (CaO) based on the quantitative elemental analysis of step 1. The molar ratio of the aluminium in the metakaolin to the calcium in the mixture must be the same as the ratio observed from step 1. Perform DTA on the mixture and determine the integrated surface area under the observed peak that ranges between 800 and 1100° C. Depending on the resolution of the DTA measurement, this peak may appear as two separate peaks, two combined peaks or one wide peak. In each case, the total integrated surface area of both peaks, of the combined peak or of the wide peak must be taken. The surface area must be expressed on a per weight basis based on the weight of the metakaolin that was present in the mixture.

5) Determine the integrated surface area under the pure calcium carbonate peak identified in step 3. Express the surface area on a per weight basis based on the weight of the calcium carbonate that was present in the measured pure calcium carbonate sample.

6) Determine the integrated surface area under the pure kaolin peak identified in step 3. Express the surface area on a per weight basis based on the weight of kaolin that was present in the measured pure kaolin sample.

7) Perform DTA on the sorbent sample and determine the integrated surface area under the peaks associated to the decomposition of calcium carbonate with an underlying peak of kaolin conversion to metakaolin (location as observed from step 3) and under the peak associated to the conversion of metakaoline (location as observed from step 4). Deconvolution of the calcium carbonate peak and the kaolin peak will be done in step 9 below.

8) Determine the weight of calcium carbonate in the sorbent sample measured in step 7 by multiplication of the calcium carbonate concentration observed from step 2 and the weight of the sorbent sample measured in step 7.

9) Determine the DTA peak surface area of the calcium carbonate in the sorbent sample of step 7 by multiplying the area per weight unit of calcium carbonate determined in step 5 and the weight of calcium carbonate in the sorbent sample determined in step 8. The resulting surface area number represents the calcium carbonate part of the combined calcium carbonate and kaolin peak in the DTA measurement of the sorbent sample carried out in step 7. The amount of kaolin in the sorbent sample can now be obtained by subtraction of the DTA surface area associated to the calcium carbonate from the combined surface area measured for the overlying calcium carbonate and kaolin DTA peaks seen in step 7. The remaining surface area represents the amount of kaoline. The amount of kaolin is consequently obtained by division of this resulting kaolin related surface area number by the area per weight unit of kaolin determined in step 6.

10) The combined amount of kaolin and metakaolin is inferred by multiplication of the integrated surface area under the peak at 800-1100° C. measured in step 7 and the area per weight unit of metakaoline obtained in step 4.

11) To determine the amount of metakaolin present in the original sample, the amount of kaolin obtained from step 9 has to be subtracted from the combined amount of kaolin and metakaolin observed from step 10. To express the amount of kaolin into the equivalent amount of metakaolin, multiply the amount of kaolin by 0.86.

REFERENCES

1. X-ray diffraction studies of the transformation of kaolinite int metakaolin: I. variability of interlayer spacings. Mitra, G. B. and Bhattacherjee, S. Vol. 54, September-October 1969, The American mineralogist, pp. 1409-1418.
2. Smith, J. D. and Fahrenholtz, W. G. Ceramic and Glass materials: Structure, properties and processing. (ed.) J. F. Shackelford and R. H. Doremus. s.l.: Springer Science and Business media, 2008. p. 102. Vol. Chapter 6: refractory oxides. ISBN 978-0-387-73361-6.

(II) Free Silica Amounts in Sorbent and in Various Fly-Ashes

The content of free silica can be determined using the CCSEM method as disclosed in Computer Controlled Scanning Electron Microscopy measurement (CCSEM; Chen. Y., 2004 Fuel Process. Technol. pp 743-761. vol. 85). The free silica pertains to silicium that is no part of a crystalline structure other than silicium and silicium dioxide. The result of the CCSEM measurements is that the sorbent contains less than 1% vol. % of free silica; that the fly-ash of the tested bituminous coals contains 10.6 vol. % of free silica; and that the fly-ash of the tested PRB coal contains less than 1 vol. % of free silica.

Fusion of fly-ash can render active free silica contained in the fly-ash inactive for stimulation of the metakaolin-containing sorbent at temperatures of more than 900° C.; even when measurements indicate that this fly-ash contains free silica. Measurement of silica activity, as discussed in example section IV thus is recommended. Fusion of fly-ash is measured by heating a pyramid of particulate fly-ash and observing the widening of this cone as a function of temperature, as described in for instance ASTMD1857.

As indicated in FIG. 1, PRB fly-ash s-BA fuses at a seriously lower temperature than that of the kaolin-containing sorbent S, and that of the bituminous fly-ash BA. PRB fly-ash is molten before it arrives at the location of sorbent injection. Without being bound to any particular theory, it is believed that this renders the silica in this fly-ash inactive.

(III) Experiments

Equipment Used: Reactors and Additives

Fixed-bed and dispersed phase tests were carried out in Inconel-steel reactors. In some fixed-bed tests additional silica material was applied in the form of quartz wool applied to keep the kaolin-containing sorbent in place in the fixed-bed reactor.

In fixed bed experiments where no silica addition from quartz wool was wanted, alumina wool was used for this purpose. Silica addition was also supplied in the form of deliberately added pure $SiO_2$; or in the form of deliberately added silica-containing fly-ash from either bituminous coal or sub-bituminous (PRB) coal.

Fixed bed tests (bench scale): Tests were typically carried out using a carrier gas including approximately 16% of $O_2$ in $N_2$. A controlled amount of the carrier gas was sent through a mercury permeation tube kept inside of a heated oil bath at approximately 100° C. The carrier gas, now doped with 125 parts per billion (ppb) of elemental mercury, is sent to either a bypass line or a reaction line. The reaction line includes a fixed-bed reactor having a 1 centimeter wide cylindrical bed typically containing approximately 1 gram of sorbent that is placed in an electrically heated and temperature-controlled oven. During a test, periodic switching between the two lines is performed to frequently measure both the mercury inlet concentration and the mercury outlet concentration, leaving the sorbent bed, at a fixed set of process conditions. The inlet mercury concentration was also validated for stability over time. Although mercury oxidation was never observed, the gas leaving either of the two lines is sent to a bubbler containing stannous chloride to convert possible oxidized mercury into elemental mercury that can be quantified using a subsequent Buck photo-analyzer.

The Buck Analyzer was calibrated approximately every three months by measuring pre-calculated concentrations of mercury in carrier gas, which concentrations were set by varying the flow of carrier gas through the system. Additionally, each individual test was calibrated by sending a stream of pure carrier gas to the Buck Analyzer. This yields a 0% transmission reading on the Buck Analyzer. Then the W tube of the Buck Analyzer is blocked, which yields a 100% transmission reading.

Dispersed phase testing: Tests were typically carried out using a carrier gas including approximately 16% of $O_2$ in $N_2$. The bench scale reactor included an externally heated vertical—1.9 meter (m) long, 47 millimeter (mm) ID Inconel steel reactor, into which MinPlus sorbent was steadily dispersed into a downward flowing carrier-gas-stream at very low rates down to 1 gram per hour (g/h).

Mercury inlet concentrations were set by flowing the carrier gas through a preheated permeation tube. The permeation tube only releases elemental mercury. The temperature of the permeation tube was controlled using an oil bath and was set to obtain a mercury concentration of the order of 25 picograms per cubic meter ($pg/m^3$). Gas sample analyses were carried out using a system built around the Tekran 2537A analyzer. A CavKit system allowed small prescribed amounts (~20 grams per cubic meter ($g/m^3$)) of mercury (Hg) to be added to the system to verify proper mercury measurement results. The Tekran analyzer is only capable of measuring elemental mercury. Prior to characterization, the sample gas was fed either through impingers containing stannous chloride to reduce potentially present oxidized mercury to its metallic form, resulting in the so-called total-mercury concentration. Bypassing these impingers results in the measurement of the elemental mercury present in the sample gas. The oxidized mercury was obtained as the difference between the total- and the elemental mercury. As the presence of oxidized mercury is not to be expected at the temperatures at which the experiments below were carried out, and as oxidation indeed was hardly visible, and as the overall mercury reduction is what is of importance in the abatement of mercury emissions, the results described below only show the overall mercury trace.

Volumetric flow rates of the carrier gas were approximately 2 liters per minute, and gas-residence times in the reactor were less than 10 seconds. Run times were of the order of hours, although the sorbent feeder required recharging after 20 minutes. The residence time of the sorbent-carrier gas mixture at the temperatures applied was typically several seconds, which is significantly longer than that occurring for sorbent injection in a full-scale power-plant. This implies that the sensitivity of the sorbent to exposure to high temperature is enhanced in the dispersed phase tests, allowing for quickly and sensitively determining possible remedies for high temperature deactivation.

(IV) Determination of Active Free Silica

1) In the present application 100% active free silica is defined as silica powder of 325 mesh having a maximum particulate diameter of 44 picometers (pm). Silica powder of this type can be obtained from Alfa Aesar (item #88316), which is over 99.5% pure $SiO_2$. Using the set-up for dispersed phase testing as described in example section III, determine the mercury capture at approximately 1000° C. of a mixture of metakaolin-containing sorbent disclosed in WO9606057 with and without the addition of approximately 35% by weight of the silica powder relative to the combined kaolin and metakaolin content of this sorbent (as measured using the method discussed above) with a carrier-gas rate such that the percentage of mercury capture observed after 120 minutes is approximately 50%.

2) For a free silica-containing composition, such as fly-ash, determine the amount of fly-ash giving the same rate of mercury capture as under step 1 in the presence of silica powder. This amount is equivalent with the same amount of 100% active free silica.

(V) Results

Figure 2:
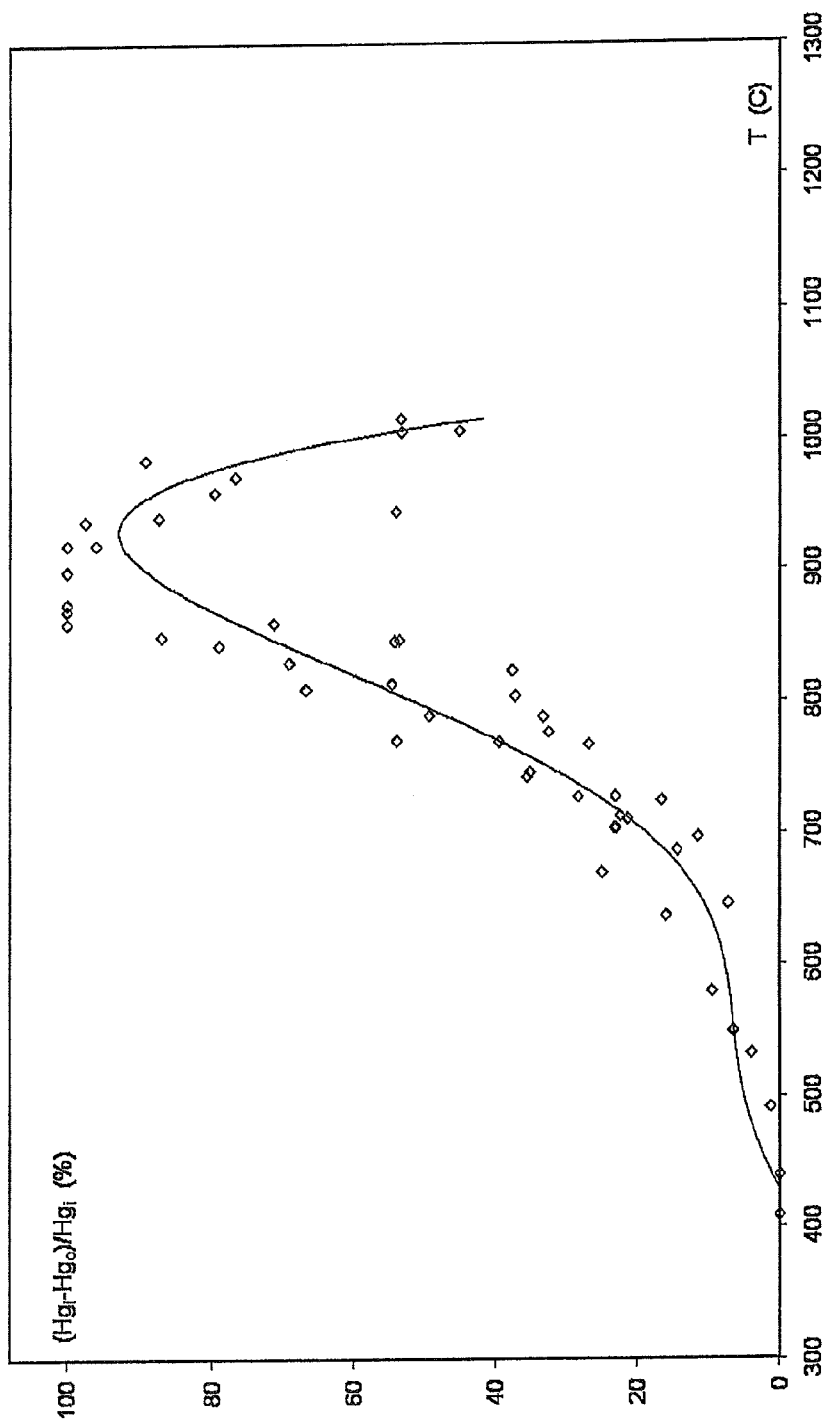
FIG. 2 represents a graph depicting temperature-dependent mercury capture on pure metakaolin-containing sorbent.

Fixed bed testing of the metakaolin-containing sorbent resulted in FIG. 2, with mercury capture defined as:

$$\text{mercury capture (\%)} = \frac{\text{mercury inlet concentration} - \text{mercury outlet concentration}}{\text{mercury inlet concentration}}$$

FIG. 2 displays results from fixed bed testing with only a kaolin- or metakaolin-containing sorbent, that is without additives. The vertical axis shows the mercury capture. The horizontal axis shows the temperature at which this mercury capture has been observed. In accordance with the above-mentioned formula, mercury capture is defined as the quantity of mercury that is removed from the gas (mercury in the ingoing gas stream—mercury present in the gas stream leaving the fixed bed) divided by the quantity of mercury that was originally present in the gas (mercury in). The amount of free silica in the sorbent sample is less than 1%, as measured with the aforementioned CCSEM method. The amount of kaolin in the sorbent sample is approximately 31.6%.

Fixed bed testing of pure kaolin resulted in a similar plot as shown in FIG. 2, but reaching less than half the amount of mercury capture. Fixed bed testing in the presence of silica in the form of a reactor filled with quartz wool or deliberately added silica, at temperatures of approximately 900° C. resulted in no significant mercury capture. The results of these various silica-only tests are summarized in the table below as 'empty reactor'. All pure samples tested were proanalysis laboratory grade powders of approximately equal particle size as the kaolin-containing sorbent. Also, the empty inconel-steel reactor did not show mercury capture. Clearly, pure silica, pure calcium oxide and mixtures thereof do not produce significant mercury sorption at a temperature of approximately 900° C.

Material tested in fixed bed. Mercury sorption at indicated temperature

|  | 800° C. | 850° C. | 900° C. |
|---|---|---|---|
| Empty reactor |  |  | 0-10% |
| 100% CaO |  |  | 0% |
| 80% CaO + 20% $SiO_2$ |  |  | 0% |
| 20% CaO + 80% $SiO_2$ | 0% | 0-3% | 0% |
| 100% CaO |  |  | 0-10% |
| 100% $CaSiO_3$ |  |  | 0-10% |
| Kaolin-containing sorbent | 18% | 88% | 24% |

Dispersed phase testing of pure silica resulted in no distinguishable mercury sorption, in line with the fixed bed results shown above.

Figure 3:
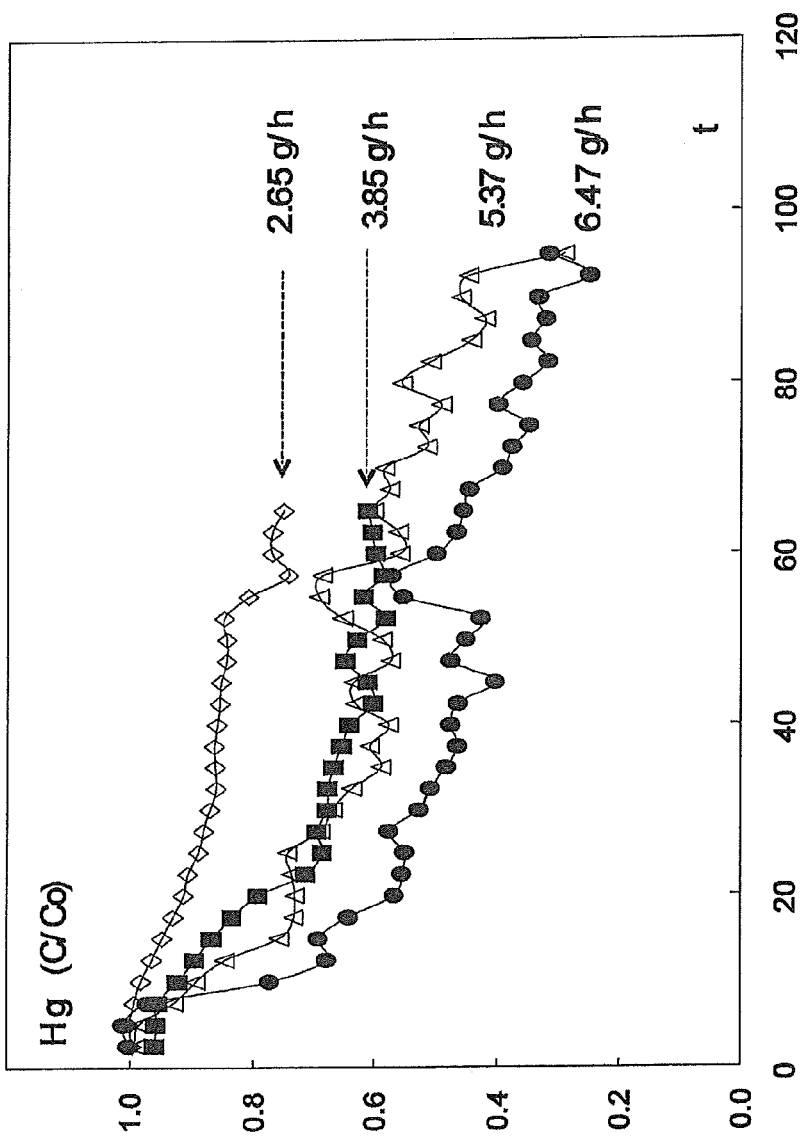
FIG. 3 represents a graph depicting metakaolin-containing sorbent dosage-dependent mercury sorption.

FIG. 3 displays results from dispersed phase testing of the pure sorbent at 900° C. The vertical axis shows the decrease of the mercury concentration in the gas stream, defined by:

$$\frac{C - \text{mercury at outlet of the reactor}}{C_0 - \text{mercury inlet concentration}} = 1 \text{ mercury capture}$$

The horizontal axis shows the time in minutes during which the sorption experiment was carried out. The captions for the various experiments refer to the amount of sorbent material that was added during each experiment (in grams per hour (g/hr)). The sorbent composition was the same as that applied in FIG. 2.

The inventors have considered the question why the mercury concentration does not decrease within a few seconds or minutes, as could be expected on the basis of the short residence time of both the mercury containing gas and the free falling sorbent particles in the reactor, and contemplate in this connection that the sorbent is converted in a more reactive phase, as is described in this application. This conversion takes more than a few seconds, which may have occurred in a deposited layer of sorbent material on the walls of the reactor. At the end of the experiments such deposition layers were easily observed by the naked eye.

FIG. 3 furthermore shows that higher mercury capture is obtained at higher sorbent dosage rates, leaving room for further improvement if higher sorbent reactivity could be obtained.

Figure 4:
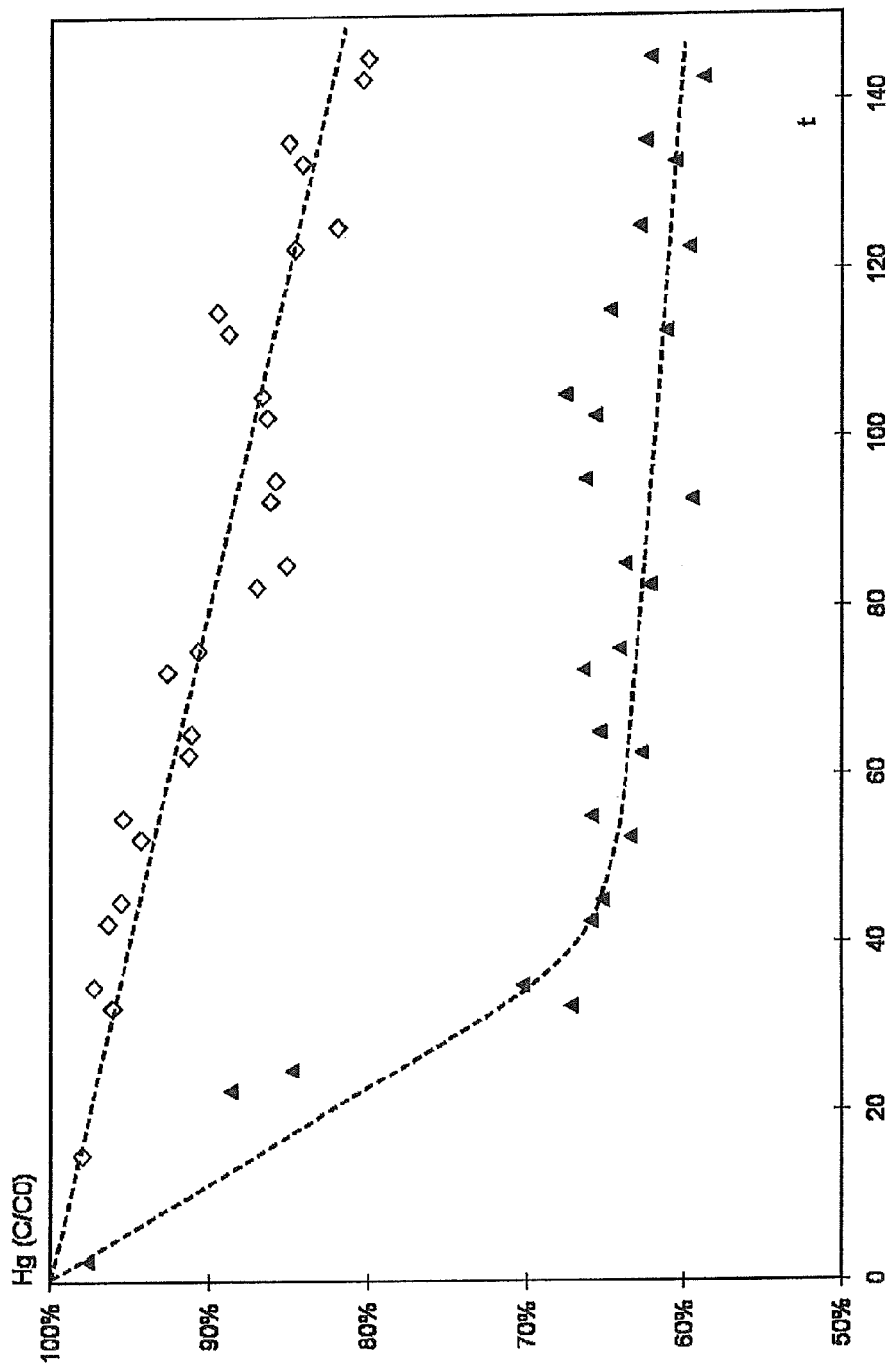
FIG. 4 represents a graph showing increased mercury capture at 1000° C. in case of addition of silica-containing fly ash to metakaolin-containing sorbent.

FIG. 4 displays results from dispersed phase testing of the pure sorbent and of a sorbent-fly-ash mixture, both at 1000° C. The vertical and horizontal axes of this figure have the same meaning as those of FIG. 3, that is the vertical axis shows the decrease of the mercury concentration in the gas-stream, and the horizontal axis shows the time in minutes during which the sorption experiment was carried out.

Experimental results indicated by open diamonds refer to testing of the pure sorbent. Experimental results indicated by closed triangles refer to testing of a mixture containing approximately 10% of pure sorbent and 90% of silica containing bituminous fly-ash. The sorbent material had a free silica content of less than approximately 1 volume %, whilst the silica containing bituminous fly-ash had a free silica content of approximately 10.6 volume %, both as measured with the earlier mentioned CCSEM method.

Both experiments were carried out using the same flux (g/hr) of solid (sorbent or sorbent/fly-ash mixture) material. FIG. 4 shows that the replacement of approximately 90% of sorbent material by silica-containing fly-ash results in improved mercury sorption, as can be inferred from the difference between the open diamonds and the solid triangles. The diamonds in FIG. 4 demonstrate the reduced mercury sorption for the kaolin-containing sorbent at temperatures of more than approximately 1000° C. when compared to the sorption obtained at 900° C., in line with the results shown in FIG. 2. The triangles in FIG. 4 furthermore demonstrate that the addition of silica-containing fly-ash results in an increased mercury sorption at approximately 1000° C., even at the approximately 90% lower amount of kaolin-containing sorbent that is applied.

As in FIG. 3, activation of the sorbent or of the mixture of sorbent and fly-ash takes a longer time than the residence time of gas or of the free falling sorbent. This implies that part of the sorbent or of the mixture of sorbent and fly-ash has resided for a longer time in the reactor, which may have occurred in a deposited layer of sorbent material on the walls of the reactor. At the end of the experiments such deposition layers were easily observed by the naked eye.

Figure 5:
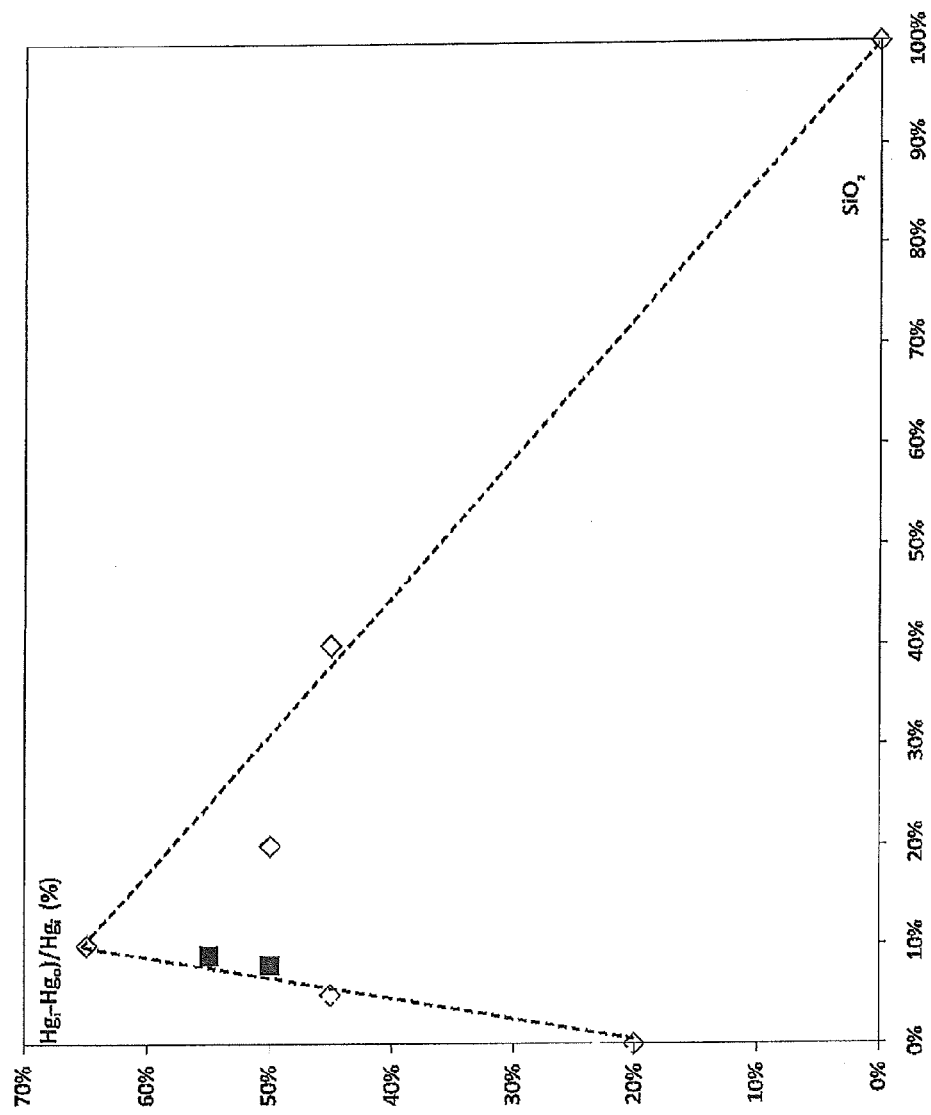
FIG. 5 represents a graph demonstrating the effect of active free silica and bituminous fly-ash on mercury capture by metakaolin-containing sorbent.

If the experiment is performed at approximately 1000° C. and part of the (meta)kaolin-containing sorbent (commercially available Min-Plus sorbent) is replaced by active free silica, there is no capture of mercury if all the (meta)kaolin-containing sorbent is replaced by free silica (see FIG. 5). FIG. 5 shows summarizing results from dispersed phase testing at approximately 1000° C. The vertical axis shows mercury capture using the same definition as was discussed for FIG. 2. The horizontal axis shows the amount of free silica that was present in the sorbent or in the sorbent fly-ash mixture or in the sorbent-silica mixture as applied in each experiment. All experiments were carried out using the same flux (g/hr) of solid (sorbent or sorbent-fly-ash mixture or sorbent-silica mixture) material.

A low percentage of active free silica suffices to improve the capture of mercury significantly. If a similar amount of fly-ash from bitumous coal is used, the amount used being based on the amount of silica present, instead of the free silica, similar high capture of mercury is observed.

Experiments on mixtures of PRE fly-ash with less than 1 volume % of free silica as measured with the earlier mentioned CCSEM method and kaolin or metakaolin-containing sorbent did not result in an improved mercury conversion (results not shown in FIG. 4). In fact, the mercury conversion was reduced which is probably due to the lower amount of sorbent applied when adding the PRB fly-ash, as was done similarly as in the experiments on mixtures of bituminous fly-ash and kaolin or metakaolin-containing sorbent.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for the removal of mercury from a stream of flue gas obtained from a combustion of at least one coal, the method comprising the steps of:

introducing a metakaolin-containing sorbent into the stream of flue gas for removing the mercury from the stream of flue gas, wherein the stream of flue gas has a temperature of at least approximately 900° C. at a point where said metakaolin-containing sorbent is introduced;

introducing a source of active free silica to increase an active free silica content of the stream of flue gas resulting from the combustion by introducing additional active free silica; and contacting the mercury with said metakaolin-containing sorbent in the presence of said active free silica.

2. The method according to claim 1, wherein the stream of flue gas has a temperature of >approximately 1000° C. at said point wherein said metakaolin-containing sorbent is introduced.

3. The method according to claim 1, wherein an amount of active free silica in the stream of flue gas is made larger than a total amount of active free silica derived from said at least one coal and said metakaolin-containing sorbent.

4. The method according to claim 1, wherein said at least one coal has an ASTM D388 coal rank of ≥3.

5. The method according to claim 1, wherein said metakaolin-containing sorbent is introduced into the stream of flue gas by dispersion into stream of flue gas.

6. The method according to claim 1, wherein a sorbent mixture is introduced into the stream of flue gas, said sorbent mixture including said source of active free silica mixed with said metakaolin-containing sorbent.

7. The method according to claim 1, wherein a weight percentage of said active free silica content relative to a weight of metakaolin from said metakaolin-containing sorbent is between approximately 10 to 80%.

8. The method according to claim 7, wherein said weight percentage of said active free silica content relative to said metakaolin is between approximately 20 to 60%.

9. The method according to claim 8, wherein said weight percentage of said active free silica content relative to said metakaolin is between approximately 30 to 50%.

10. The method according to claim 1, wherein said metakaolin-containing sorbent is introduced into a boiler upstream from a heat exchanger for cooling the stream of flue gas.

11. The method according to claim 1, wherein said active free silica from the combustion of said at least one coal is derived from a bituminous coal.

12. The method according to claim 1, wherein said source of active free silica is an active free silica fly-ash obtained from a combustion of a bituminous coal.

13. The method according to claim 12, wherein said metakaolin-containing sorbent is a sorbent obtained by a thermal conversion of a kaolin-containing paper residue to a material having a plurality of pozzolanic properties, wherein said kaolin-containing paper residue is thermally treated in a fluidized bed installation having a heat transfer device for promoting heat transfer and a freeboard in the presence of an oxygen-containing gas, said fluidized bed being operated at a temperature between approximately 720 and 850° C. and said freeboard being approximately 850° C. or lower.

14. The method according to claim 1, wherein said metakaolin-containing sorbent is a sorbent obtained by a thermal conversion of a paper residue.

* * * * *